March 20, 1945.　　　H. H. LIESE ET AL　　　2,371,966
SEALING MEANS FOR THE PISTON OF A GASHOLDER
Filed March 31, 1942　　　3 Sheets-Sheet 2

INVENTORS
Herman H. Liese
Herbert C. Brinkman
BY
Wood, Arey, Herron & Evans
ATTORNEYS

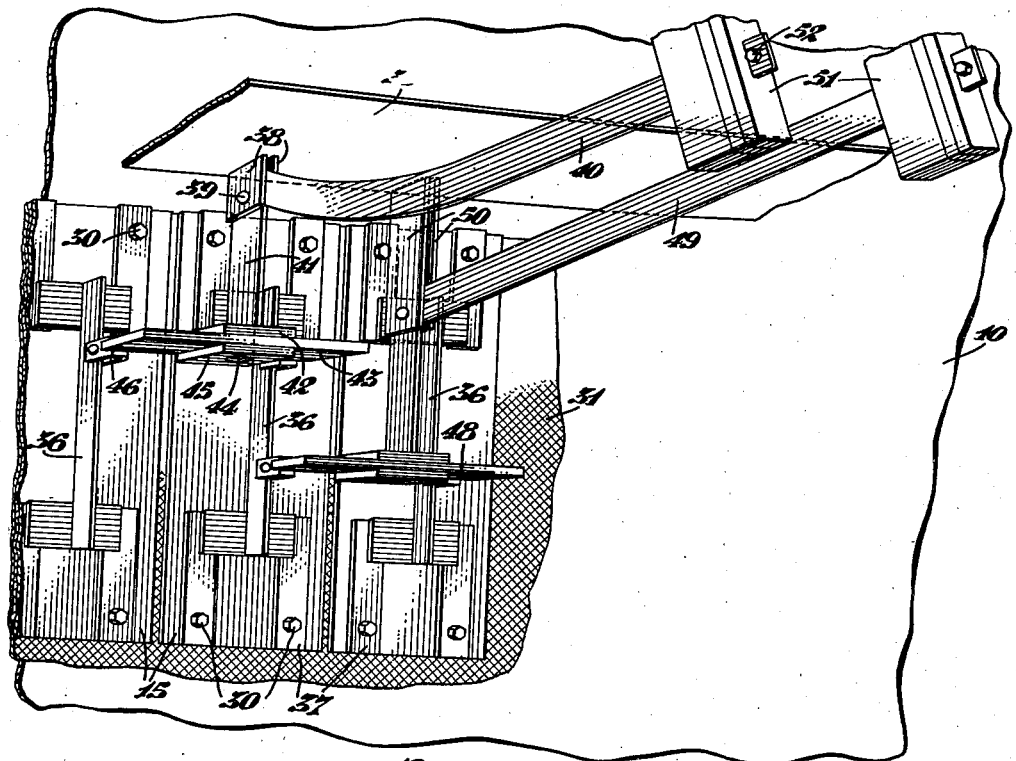
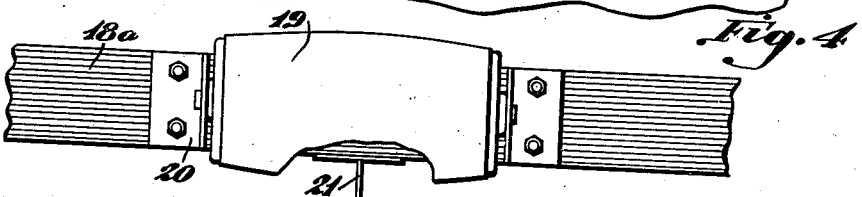
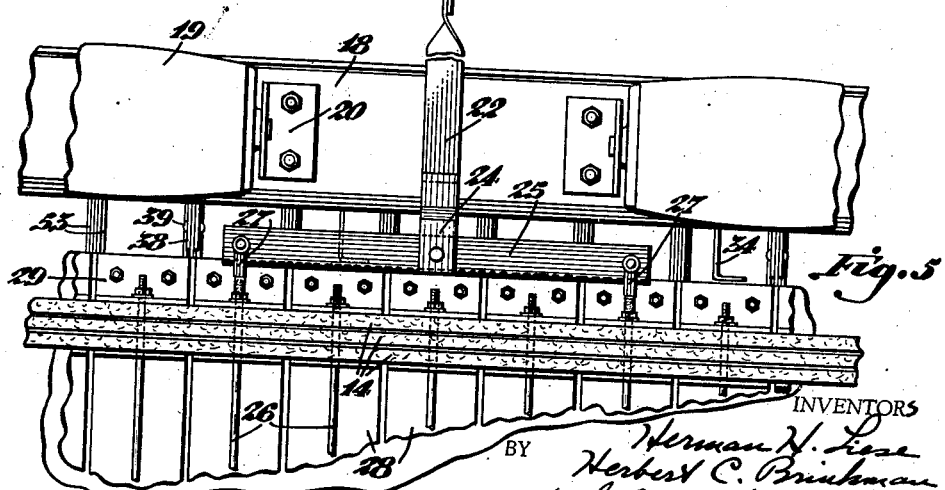

Patented Mar. 20, 1945

2,371,966

UNITED STATES PATENT OFFICE 2,371,966

SEALING MEANS FOR THE PISTON OF A GASHOLDER

Herman H. Liese and Herbert C. Brinkman, Cincinnati, Ohio, assignors to The Stacey Bros. Gas Construction Company, Cincinnati, Ohio, a corporation of Ohio Application March 31, 1942, Serial No. 437,096

1 Claim. (Cl. 48—176)

This invention relates to gasholders of the type including a vertically translatable piston or deck within a reservoir, which piston functions as a movable top closure for the gas contained in the reservoir tank. The gas is confined in the space between the piston and the closed base of the holder and the piston, by its weight, maintains the gas under pressure, and vertically adjusts for accommodating the gas supply contained in the reservoir. This type of gasholder is commercially identified as a waterless gasholder.

The present invention is concerned with improvements in the construction of the sealing unit for the piston and in the means which holds the sealing unit outwardly against the holder wall. The sealing unit conventionally includes an arrangement of one or several packing rings assembled in such manner as to be dilatable. Means have been provided for constantly urging or forcing this dilatable unit outwardly under pressure against the wall of the holder under the influence of weights which are effective against the unit through levers.

In the past, these packing rings have been supported upon a sheet metal ring, which ring included vertically disposed flutes or ribs, or which was made up of sections secured together or lying in abutment. Thus, the ring could dilate either in contractive or expansive movement and could bend to any irregular shape within reasonable limits for maintaining the mechanical seal or packing ring in uniform and positive contact with the wall of the holder throughout the entire inner circumference thereof.

It has been the object of the present inventors to provide improvements in the sealing unit for the piston of a gasholder of this type, whereby the sealing unit has increased flexibility or elasticity and wherein the packing rings more readily adjust to irregularities in the contour of the holder wall. Toward this end, the packing rings are assembled upon vertically disposed plate sections and these plate sections are slightly spaced so as to be independently movable relative to each other.

It has been a further object of the present inventors to provide an improved arrangement of the weighted levers relative to the sealing unit whereby these weighted levers, through contact means, engage the ring plate sections at different elevations and wherein each section is engaged at two or more levels; as for example, toward the top and bottom of the sealing unit assembly.

Thus, it has been provided, through an improved arrangement of the weights, that the upper and lower packing rings move more freely in a horizontal direction and act more independently of each other than has been the case heretofore. The sealing unit is not only dilatable, but is free to shift from a strictly vertical line of contact, within reasonable limits, to accommodate displacements of the holder wall from a vertical line. In other words, the arrangement of the contact levers is such that the packing may tip slightly when necessary and all of the packing rings will still remain in contact with the holder wall.

It has been a further object of the present inventors to provide an improved means for hanging or suspending the sealing unit relative to the piston, whereby there is no interference with the action of the weighted levers in their function of moving the sealing unit radially.

Other objects and certain advantages of the invention will be more fully apparent from the following description of the drawings in which:

Figure 4 is a general perspective view looking upward at an angle and illustrating the mounting and arrangement of the weighted levers which engage the packing or sealing unit.

Figure 5 is a fragmentary outside view of a portion of the seal unit showing one of the hangers or suspension means.

Figure 1:
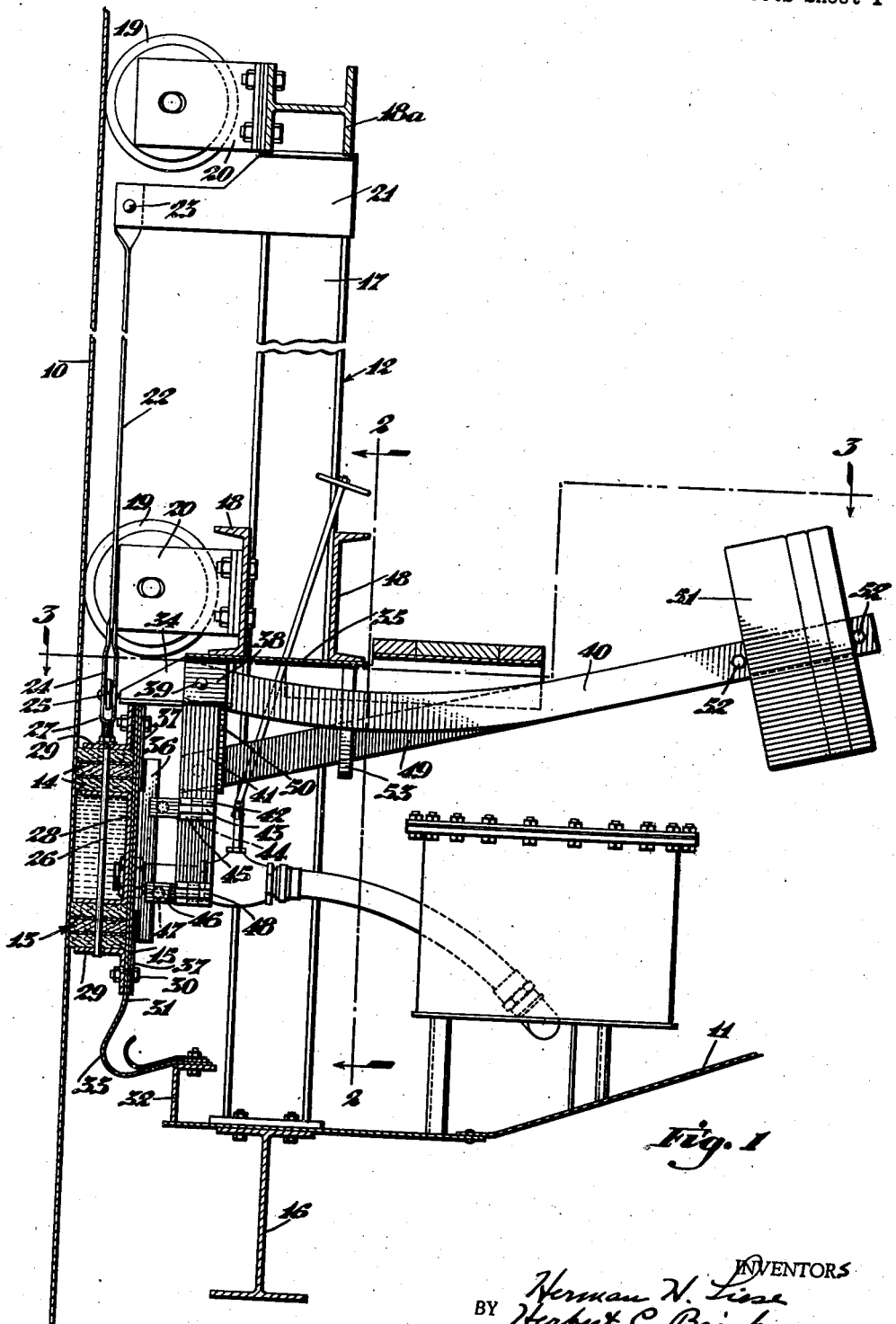
Figure 1 is a fragmentary vertical sectional view taken radially through one side of a gasholder tank, illustrating a portion of the piston and showing the packing rings and their supporting means relative to the piston and the cylinder wall.
Figure 2:
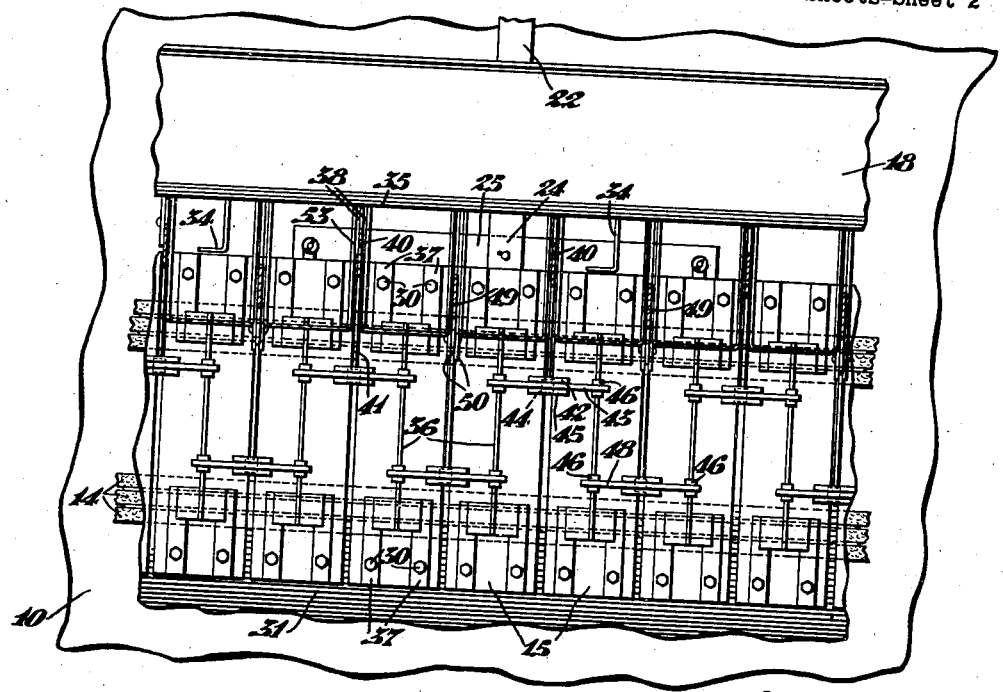
Figure 2 is a fragmentary sectional view taken on line 2—2, Figure 1, illustrating a portion of the dilatable sealing ring.
Figure 3:
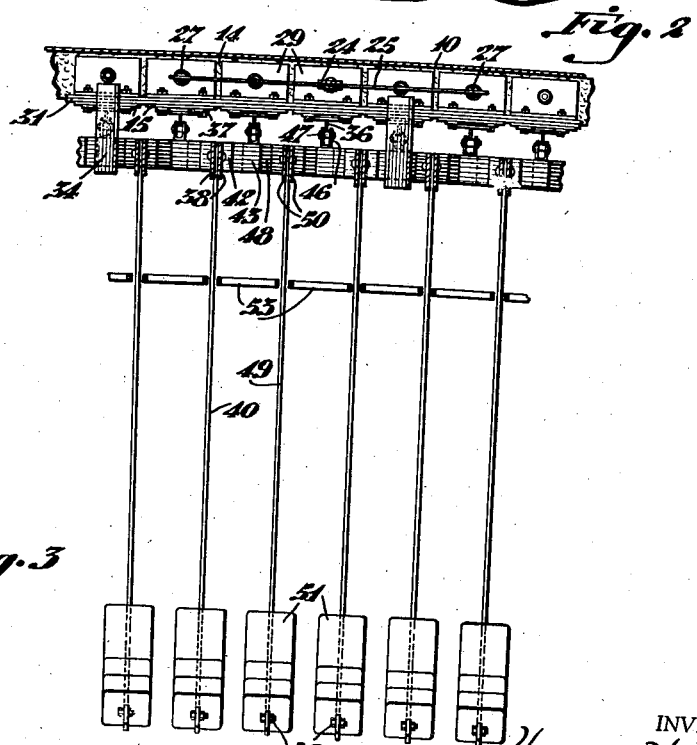
Figure 3 is a sectional view taken on line 3—3, Figure 1, further illustrating a portion of the packing or sealing ring and illustrating the arrangement of the weights relative thereto.

Generally speaking, the construction in which the present improvements are incorporated provides a sealing unit including packing or sealing rings and a flexible dilatable ring made up of circumferentially arranged sheet metal plate sections engaged by weighted levers for the purpose of providing efficient sealing contact of the sealing rings with the holder wall. The present improvements relate primarily to the arrangement of the weighted levers and the means for causing these weighted levers to engage the packing ring assembly uniformly for urging it outwardly against the holder wall.

Referring to the drawings, the wall of the tank or holder is indicated at 10 and the deck or piston at 11. A superstructure, generally indicated at 12 is provided as a part of the outer edge structure of the piston. This superstructure carries the sealing unit generally indicated at 13. The sealing unit is fabricated of sealing rings 14, the supporting plate sections 15, and certain other assembly elements hereinafter described.

It is not believed necessary to describe the structure of the piston and its superstructure in exact detail. These parts are only described to the extent believed necessary to make clear the mounting and environment of the sealing unit improvement of this invention.

The piston proper may be stated to comprise a fabricated structure on which plates are provided to make up a cup-shaped piston. The margin of the piston incorporates circumferentially arranged I beams 16. A series of vertically disposed I beams 17 rise above and are supported on these I beams 16. Appropriate bracing is provided between the vertical I beams and the piston, but it is believed unnecessary to illustrate such bracing.

The uprights 17 are joined by angle iron and channel iron elements 18—18 as well as horizontally disposed I beams 18a, extending around the top of the uprights. Together, these elements form a vertical frame structure which supports a plurality of circumferentially arranged rollers 19 mounted on brackets 20 attached to the outer angle iron elements 18—18 and the I beams 18a respectively. The rollers 19 engage the inner wall of the shell and form the guiding means for the piston; more specifically, the means for preventing tilting of the piston.

The sealing unit 13 is supported or suspended from the outer ends of radially disposed, circumferentially arranged support arms 21, by means of straps or hangers 22. These arms are fixed to the upright girder 17 or to the undersides of the I beams 18a. The hanger straps are pivotally attached to the arms 21 by means of bolts or pins 23 (Figure 5). The lower ends of the hanger straps include loop elements 24. Each strap has a hanger bar 25 traversing its particular loop, which bar is extended an equal distance from either side of the hanger. The ends of this hanger bar 25 are attached to the assembly draw bolts 26 of the sealing unit by means of yoke elements 27. The lower ends of the yokes constitute nuts screwed on the upper ends of the draw bolts 26 and their upper ends are bifurcated for straddling the ends of the suspension bar.

The sealing rings 14 of the sealing unit are arranged in sets, upper and lower respectively. These sets are spaced by means of outwardly facing channel iron elements 28 being engaged against its upper and lower flanges respectively. The seal rings are adapted to provide continuous engagement with the inner wall of the holder shell. The upper and lower flanges of the channel iron do not extend outwardly as far as the rings and therefore, do not contact the wall of the holder.

The space within the channel iron is supplied with a mobile medium such as a plastic, which may consist of a heavy colloidal solution of soap and oil or a fluid of the type exemplified by lubricating oil or some substance having an intermediate consistency. This medium is supplied through reservoirs and connections described in detail in the patent to Gruening No. 2,165,179, issued July 4, 1939. The description of this portion of the disclosure in this specification appears unnecessary.

Upper and lower angle irons 29 are provided and extend circumferentially. These angle irons are held together against the upper and lower sets of rings respectively by means of the draw bolts 26, whereby the sealing rings are clamped upon the channel iron member. Each of the plates 15 are held in position upon the ring assembly by means of bolts 30 traversing the upper and lower ends of the plates and the vertically disposed flanges of the respective angle irons. A fabric seal ring 31, consisting of a sheet of material disposed circumferentially, is interposed between the plates 15 and the remainder of the seal, and depends therefrom for attachment to a circumferentially arranged anchorage rail 32. The attachment of the fabric seal ring to the rail 32 is such as to provide fullness in the fabric seal ring as indicated at 33. Thus, a certain amount of free movement is permitted with respect to the piston.

A series of projected stop elements 34 extend outwardly radially from plates 35, which plates are secured to the underside of the elements 18. These stop elements extend out over the upper edge of the sealing unit and normally clear the sealing unit so as not to interfere with its flexibility and freedom of movement.

The invention, as stated, provides an improved means for urging the sealing unit outwardly, uniformly against the holder wall. For this purpose, each of the plates 15 includes a contact element in the nature of a rail 36 secured against its inner face centrally thereof. These rails are disposed vertically and lie in radial planes. They are secured to their respective plates by means of feet 37—37 at the upper and lower ends respectively. The pressure applying means engaging these contact rails are staggered so as to exert the pressure against both the upper and lower ends of the rails. Weighted levers are employed. These weighted levers are practically the same except for the level of their mounting and contact with the rails.

The pivotal attachment means for one set consists of short, slightly spaced plates 38 welded to the underside of the horizontal plate 35, each including a pivot pin 39 traversing its particular lever 40 at its fulcrum. Each lever 40 is curved upwardly to its fulcrum point and then turns down substantially at right angles or vertically to constitute an extension 41. The base of the extension includes a horizontally extended foot 42. A yoke bar 43 is pivotally supported on this foot for swinging movement in a horizontal plane. The pivotal connection is accomplished by means of a pin 44 traversing the intermediate point of the bar with the bar held on the pin by means of a plate 45. The outer ends of the bar include bifurcated arms 46 carrying rollers 47 therebetween. The rollers are mounted on horizontal axes and engage the inner vertical edges of the rails 36.

The staggered arrangement of these bars is best illustrated in Figure 4. The contact means, just described, engages the upper ends of adjacent rails. The other contact means, the bars of which are indicated at 48, engage the adjacent rails of the sets engaged by the upper bars 44. Since these bars 48 are disposed at the lower plane, the fulcrum points for their levers 49 are lower than the fulcrum points for the levers 40 and the supporting members 50 therefore extend downward a greater distance from the plate 35. The arms 49 are straight and extend into the same plane as the outer ends of the arms 40. All these arms, that is, 40 and 49, carry weights 51 at their free or inwardly disposed ends, the weights being held on the bars by means of pegs or screws 52.

In order to prevent swinging of the arms 40 and 49, U-shaped spacer members 53 are provided. The upper ends of the arms of these members are welded to the underside of the plate 35. The U-shaped members thus afford guide spaces between them, which spaces are traversed by the arms.

The arrangement of the contact bars is best illustrated in Figure 4. It will be evident from the view that the sealing unit will tip from a strictly vertical plane to adjust to a corresponding variation in the normally vertical line of the tank wall. As a result of this, both sets of packing rings are kept in contact with the holder wall. The ring is not only dilatable for adjustment to variations in the circular contour of the tank wall but is adjustable to accommodate vertical disalignment.

Having described our invention, we claim:

A sealing mechanism for a waterless type of gasholder in which a piston is disposed within a shell and the gas is stored between the piston and the base of the holder within the shell so that the piston rises and falls in response to variations in the amount of gas being stored, said sealing mechanism comprising two flexible packing rings spaced apart vertically and adapted to be pressed outwardly against the inner wall of the holder, a flexible gas-tight connection between the packing rings and the piston, a series of plates segmentally arranged backing up each of the vertically spaced packing rings, rigid elements backing up said plates, said rigid elements adapted to press said plates outwardly and thus force the packing rings into contact with the inner wall of the shell, said rigid elements being alternately disposed at an upper level and a lower level so that each plate is pressed outwardly at two points one above the other and pressure means alternately disposed at an upper level and a lower level pressing against the rigid elements backing up the plates.

HERMAN H. LIESE.
HERBERT C. BRINKMAN.